United States Patent
Aharoni et al.

(10) Patent No.: US 8,806,627 B1
(45) Date of Patent: Aug. 12, 2014

(54) CONTENT RANDOMIZATION FOR THWARTING MALICIOUS SOFTWARE ATTACKS

(71) Applicant: EMC Corporation, Hopkinton, MA (US)

(72) Inventors: Idan Aharoni, Tel Aviv (IL); Daniel T. Cohen, Even Yehuda (IL); Yariv Amar, Ramla (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/716,327

(22) Filed: Dec. 17, 2012

(51) Int. Cl.
*G06F 11/00* (2006.01)
*G06F 12/14* (2006.01)

(52) U.S. Cl.
USPC .......................................................... 726/22

(58) Field of Classification Search
CPC ............ H04L 63/1416; H04L 63/1408; H04L 63/145; H04L 29/06; H04L 29/08072; H04N 7/1713
USPC ................ 726/22, 24; 709/203, 228; 308/206
See application file for complete search history.

(56) References Cited

U.S. PATENT DOCUMENTS

| | | | | |
|---|---|---|---|---|
| 7,089,425 B2 * | 8/2006 | Chan | | 713/189 |
| 7,472,165 B2 * | 12/2008 | Sawada | | 709/207 |
| 7,702,925 B2 * | 4/2010 | Northcutt et al. | | 713/193 |
| 7,774,434 B2 * | 8/2010 | Sawada | | 709/219 |
| 8,230,082 B2 * | 7/2012 | Deval et al. | | 709/228 |
| 2012/0047426 A1 * | 2/2012 | Hauser | | 715/234 |

* cited by examiner

*Primary Examiner* — Fikremariam A Yalew
(74) *Attorney, Agent, or Firm* — Ryan, Mason & Lewis, LLP

(57) ABSTRACT

Content randomization techniques for thwarting malicious software attacks. In one example, a method comprises the following steps. Content is received at a randomizer module from a first computing device, the content having been retrieved by the first computing device in response to a content request by a second computing device. The content is randomly altered at the randomizer module to generate randomly altered content. Log information about the random alteration to the content is maintained at the randomizer module. The randomly altered content is sent from the randomizer module to the first computing device such that the first computing device is able to provide the randomly altered content to the second computing device in response to the content request by the second computing device. Further, the random alteration may be removed from reply content using the log information.

18 Claims, 4 Drawing Sheets

FIG. 1A

Sign in

Username

[                    ]

Password

[                    ]

[Sign in]

FIG. 1B

```
<div>
  <strong>Password</strong>
  <input type="password" name="password" id="password">
</div>
```

FIG. 1C

Sign in

Username

[                    ]

Password

[                    ]

Credit Card No.

[                    ]

[Sign in]

FIG. 1D protocol://server/path/program?payeeAccount=987654321&amount=123.45

CONTENT RANDOMIZATION FOR THWARTING MALICIOUS SOFTWARE ATTACKS

FIELD

The field relates to security techniques, and more particularly to content randomization techniques for thwarting malicious software (malware) attacks.

BACKGROUND

Today, sophisticated yet highly available malware enables fraudsters to automate transfers from victims' online accounts, as well as perpetrate other acts of fraud. For example, the malware waits for the legitimate user to log in to a web site associated with the account and then activates a script which initiates a fraudulent money transfer without the customer knowing. This attack is known as a Man-In-The-Browser (MITB) attack. Another form of attack is to "inject" additional fields in web pages in order to obtain information on the victim in addition to the information already requested by the legitimate web site.

These two types of attacks are incredibly hard to stop. MITB is a huge problem today as anti-fraud systems search for characteristics in each money transfer request that do not fit the profile of the user. Yet the problem is that the web site sees this request as being sent from the legitimate machine of the user, and therefore may not be able to detect that it is actually being sent by the malware without the user's knowledge.

SUMMARY

Embodiments of the invention provide content randomization techniques for thwarting (reducing or eliminating) malware attacks.

In one embodiment, a method comprises the following steps. Content is received at a randomizer module from a first computing device, the content having been retrieved by the first computing device in response to a content request by a second computing device. By way of example only, the first computing device is a web server and the second computing device is a client device. The content is randomly altered at the randomizer module to generate randomly altered content. Log information about the random alteration to the content is maintained at the randomizer module. The randomly altered content is sent from the randomizer module to the first computing device such that the first computing device is able to provide the randomly altered content to the second computing device in response to the content request by the second computing device.

In a further embodiment, reply content is received at the randomizer module from the first computing device, the reply content having been received from the second computing device in response to the randomly altered content. The random alteration is removed from the reply content at the randomizer module using the log information. The reply content is sent from the randomizer module to the first computing device after removal of the random alteration.

In another embodiment of the invention, a computer program product is provided which comprises a processor-readable storage medium having encoded therein executable code of one or more software programs. The one or more software programs when executed by at least one processor implement steps of the above-described method.

In yet another embodiment of the invention, an apparatus comprises a memory and at least one processor operatively coupled to the memory and configured to perform steps of the above-described method.

Advantageously, embodiments of the invention provide techniques for thwarting malware attacks including, but not limited to, malware that employs an injection type attack and/or an MITB type attack. By randomizing content that the malware acts upon, the malware is unable to perform its intended function.

These and other features and advantages will become more readily apparent from the accompanying drawings and the following detailed description.

BRIEF DESCRIPTION OF THE DRAWINGS

FIGS. 1A through 1D illustrate how two types of malware attacks associated with web site content are performed.

DETAILED DESCRIPTION

Figure 2:
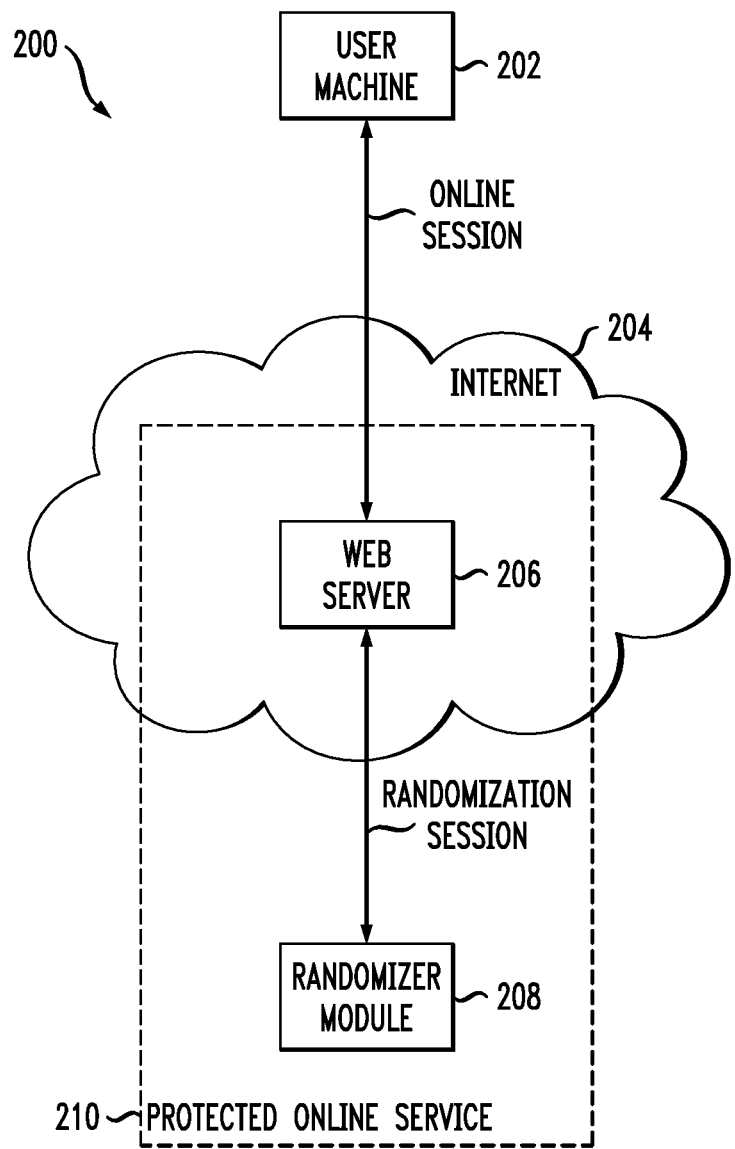
FIG. 2 illustrates a distributed computer system with web site content randomization functionality in accordance with one embodiment of the invention.

Illustrative embodiments of the invention will be described herein with reference to an exemplary system in which a user device (referred to herein as a user machine or client device) communicates with a server (referred to herein as a web server). It is to be appreciated, however, that embodiments of the invention are not limited to use in this or any other particular system configuration.

Before describing illustrative content randomization embodiments of the invention, examples of how a fraudster may implement an injection attack and an MITB attack will be described.

FIGS. 1A through 1C illustrate an example of the HTML (HyperText Markup Language) injection attack. In the HTML injection attack, the user machine is infected with malware, perhaps inadvertently downloaded from an email attachment or some other selected link or downloaded file. The HTML injection attack malware detects when the user accesses a subject HTML page online, and before the HTML page is displayed to the user on his/her display screen, the malware inserts one or more additional fields into the HTML of the page to request additional user data.

For example, consider the typical login page 102 in FIG. 1A which includes a username field 104 and a password field 106. To perform the HTML injection, the malware looks for certain string tokens in order to identify the location in the HTML code in which it should insert (inject) the HTML code to request the additional data from the user. So in the example in FIG. 1A, assume that the malware searches the HTML code for the string token 108 shown in FIG. 1B. String token 108 is the HTML code that represents the password field 106 on login page 102. Thus, the malware uses the password field 106 to pinpoint the location after which to insert additional HTML code.

Once the malware finds the string token 108, the malware inserts/injects further HTML after the string token 108 that requests the additional user data. In this example, the malware inserts HTML code that renders an additional field 112 that asks for a credit card number of the user. The altered HTML page 110 is shown in FIG. 1C. Since page 110 generally appears to look like the login page (i.e., page 102) the user is accustomed to seeing when accessing the subject web site, the user enters his/her credit card information. The credit card information is then captured by the malware and reported to the fraudster for use in fraudalent transactions (e.g., unauthorized online purchases).

Turning to the MITB type of malware attack, again the user machine is infected with malware that is somehow downloaded without the user being aware of its presence. The malware waits for the user to log in to a web site and then activates a script. Script, as used here, refers to a simple program language, e.g., a function/procedure of the malware program that executes. The script causes an action to be taken via the user's browser without the user's knowledge or permission. FIG. 1D illustrates an HTML POST command (i.e., client POSTs data back to the server) executed by the script 114 which initiates a fraudulent transfer of money out of the user's bank account.

It is to be understood that while the examples above illustrate HTML-based malware attacks, injection and MITB type malware exists that performs similar fraudulent actions on Javascript-based source code.

Embodiments of the invention provide techniques for thwarting malware attacks including, but not limited to, injection and MITB type attacks. For example, in one embodiment, randomization is added to the source code of the subject web site per session such that the randomization does not impact the user experience or the back-end logic, yet thwarts the malware's attempt to inject or perform actions on behalf of the user. As illustrated above, in order to perform an injection or issue a fraudulent transfer (MITB), the malware searches for string tokens within the web site's source code (HTML or Javascript), and then alters or uses that same code on the fly. It is important to emphasize that all of this is happening on the end-user's machine. By randomizing the source code, the malware will fail to find the tokens and thus fail to perform its intended actions. As will be explained, such content randomization can be done in a variety of ways. In one embodiment, form fields which are submitted to the web site are given randomized generated names, e.g., instead of field name "username" every session, that field will have a different string. In another embodiment, a set of non-visible paragraphs are added into the web site in order to randomize the expected format of the source code, without appearing to the end-user.

The content randomization is performed on the server (back-end) side. The source code is randomized and then the user's response is de-randomized (removal of the randomization) for the back-end. In the "de-randomizing" process, the system can also be used to search and identify suspicious malicious activity. For example, if malware sends additional fields to the site that were not presented to the user, the system could block the transaction and terminate the session, while also alerting authorities (e.g., bank or web site operator/owner) in the process.

FIG. 2 illustrates a distributed computer system with web site content randomization functionality in accordance with one embodiment of the invention. This figure illustrates content randomization at the server side.

As shown, system 200 comprises a user machine 202, a web server 206 and a randomizer module 208. The user machine 202 and the web server 206 are coupled via a network 204. The network 204 may comprise, for example, a global computer network such as the Internet, a wide area network (WAN), a local area network (LAN), a satellite network, a telephone or cable network, or various portions or combinations of these and other types of networks. The randomizer module 208 is shown as being separate from the web server 206 in FIG. 2. In such a case, the randomizer module 208 and the web server 206 are coupled by the network 204 or some other network. However, alternatively, the randomizer module 208 can be implemented within the web server 206 as a software component resident on the web server 206. The web server 206 and the randomizer module 208 provide a protected online service 210 (content randomization to thwart malware) to the user machine 202.

It is to be appreciated that an embodiment of the invention may comprise multiple instances of a user machine, a web server, a randomizer module and/or other system components not expressly shown, although only single instances of components are shown in FIG. 2 for the sake of clarity of illustration.

As used herein, the term "session" refers to an interactive information interchange. For example, an online session is shown in FIG. 2 between the user machine 202 and the web server 206, while a randomization session is shown in FIG. 2 between the web server 206 and the randomizer module 208.

The user machine 202 may comprise a portable device, such as a mobile telephone, personal digital assistant (PDA), wireless email device, game console, etc. The user machine 202 may alternatively comprise a desktop or laptop personal computer (PC), a microcomputer, a workstation, a mainframe computer, a wired telephone, a television set top box, or any other information processing device which can benefit from the use of content randomization techniques in accordance with an embodiment of the invention.

The user machine 202 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device.

The web server 206 may be, for example, an application server such as a web site or other software program or hardware device that is accessed by the user machine 202 over the network 204.

The randomizer module 208 may be, for example, a server or other software program or hardware device that is accessed by the web server 206 over the network 204 (when remote from the web server) or directly (when resident on the web server).

Figure 3:
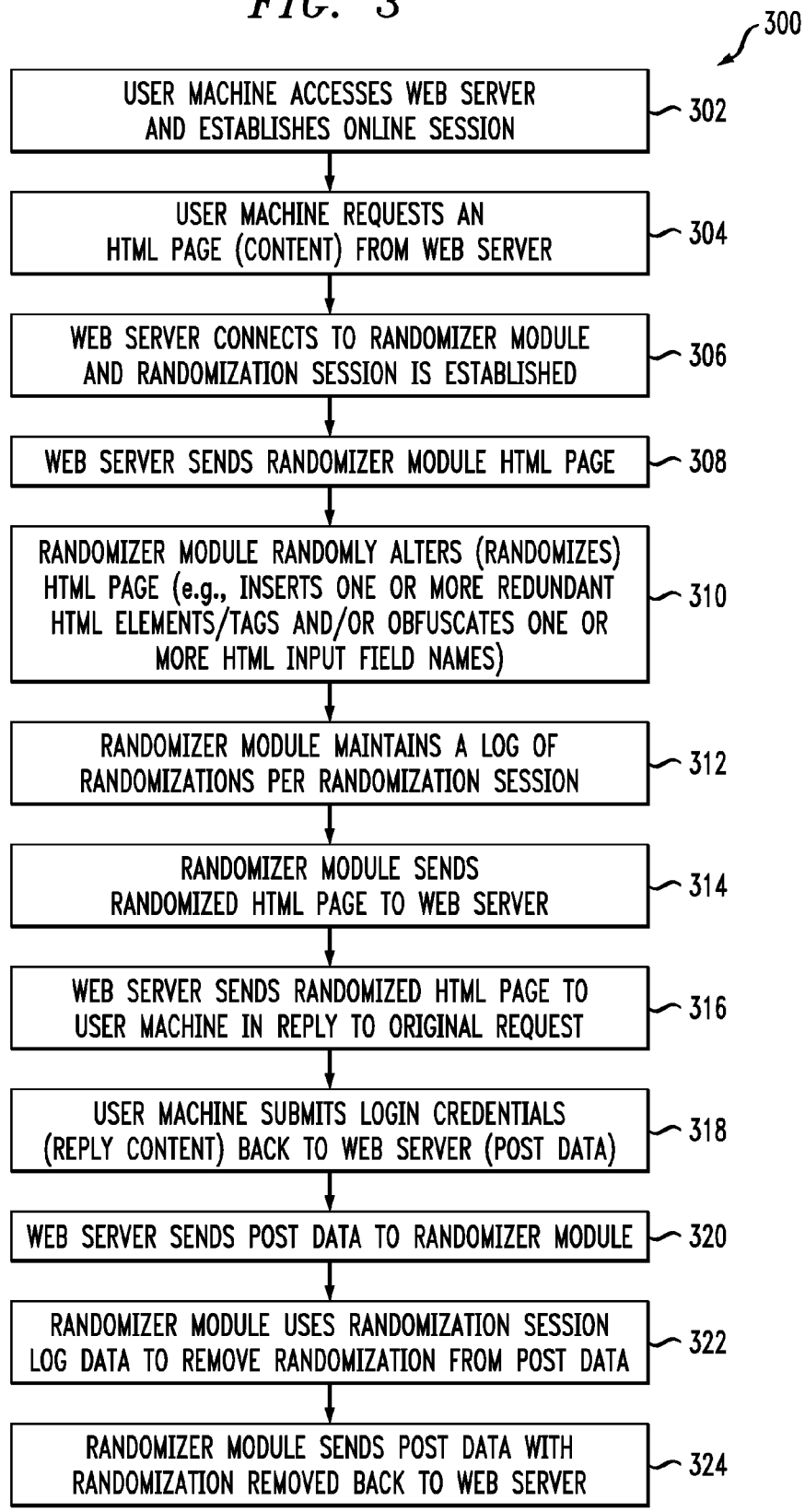
FIG. 3 illustrates a web site content randomization methodology in accordance with one embodiment of the invention.

FIG. 3 illustrates a web site content randomization methodology 300 in accordance with one embodiment of the invention. Reference will be made to the system 200 in FIG. 2. However, methodology 300 can be implemented in other system configurations.

In step 302, the user machine 202 accesses the web server 206 and establishes an online session. The user machine 202, in step 304, requests an HTML page (an example of the more general term "content") from the web server 206.

In step 306, the web server 206 connects to the randomizer module 208 and a randomization session is established. The web server 206, in step 308, sends the HTML page requested by the user machine 202 to the randomizer module 208.

In step 310, the randomizer module randomly alters (randomizes) the HTML page. For example, as mentioned above, this may comprise randomly inserting one or more redundant HTML elements/tags into the code of the HTML page. Alternatively, this may comprise randomly obfuscating (obscuring) one or more HTML input field names in the code of the HTML page. The randomizer module 208, in step 312, maintains a log of randomizations per randomization session, i.e., it keeps a history of which randomizations were applied to which HTML pages. In step 314, the randomizer module 208 sends the randomized HTML page to the web server 206.

In step 316, the web server 206 sends the randomized HTML page to the user machine 202 in reply to original request. The user machine 202, in step 318, submits reply credentials such as login credentials back to web server 206 (i.e., POST data). In step 320, the web server 206 sends the POST data to the randomizer module 208.

In step 322, the randomizer module 208 uses the randomization session log data to remove the randomization from the POST data. The randomizer module 208, in step 324, sends the POST data with the randomization removed back to the web server 206.

Multiple requests and replies between the user machine 202 and the web server 206 may be performed in a similar manner as described above with respect to steps 304 through 324.

Recall the injection attack described above in the context of FIGS. 1A through 1C. Since the HTML page has been randomized, as described in methodology 300 of FIG. 3, the injection will fail to locate the pre-defined locations and therefore the malware attack will be foiled.

Similarly, in the MITB attack described above in the context of FIG. 1D, recall that the malware scripts must know the field names into which they must provide the transaction-related data. By randomizing the field names, as described in methodology 300 of FIG. 3, the MITB scripts will attempt to POST field names (and values) that are non-existent in the current online session. By POSTing field names that are not part of the randomization manifest, the MITB attack will fail. More particularly, when the malware performs an MITB attack, using an automated script, it attempts to POST the data relating to the fraudulent transaction back to the web server, providing values for [payeeAccount] and [amount]. Because the randomizer module has obfuscated these field names (for example, into [1a983jfhsdf81ASskfg] and [8sdfKSDn38hf], respectively), the fields POSTed by the malware will not be known to (recognized by) the randomizer module, since the randomizer module is expecting [1a983jfhsdf81ASskfg] and instead receives [payeeAccount]. As such, the de-randomization will fail and a notice of such failure will be returned to the web server. This is how the automated MITB script is thwarted.

Figure 4:
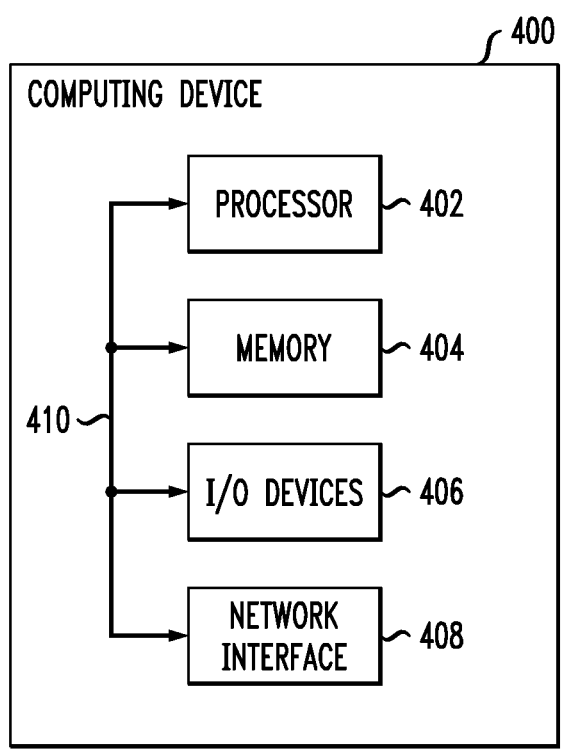
FIG. 4 illustrates a computing device architecture for one or more elements of the distributed computer system with web site content randomization functionality of FIG. 2.

FIG. 4 illustrates a computing device architecture for one or more components of the distributed computer system with web site content randomization functionality (system 200) of FIG. 2. That is, computing device architecture 400 in FIG. 4 may be respectively implemented by the user machine 202, the web server 206 and the randomizer module 208. The computing device architecture 400, as illustrated, comprises a processor 402, a memory 404, input/output devices 406 and network interface 408, all coupled via a bus 410.

The processor 402 may comprise a microprocessor, a microcontroller, an application-specific integrated circuit (ASIC), a field programmable gate array (FPGA) or other type of processing circuitry, as well as portions or combinations of such circuitry elements.

The memory 404 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the processor 402 causes the device to perform functions associated with one or more of the components of the distributed computer system 200. One skilled in the art would be readily able to implement such software given the teachings provided herein. Other examples of computer program products embodying embodiments of the invention may include, for example, optical or magnetic disks.

The input/output devices 406 may comprise one or more mechanisms for inputting data to the processor 402 (e.g., keyboard, keypad or pointing device), and one or more mechanisms for providing results or otherwise presenting information associated with the processor 402 (e.g., display, screen or other form of presentation device).

The network interface 408 comprises circuitry that serves to interface the computing device (e.g., user machine 202, web server 206, randomizer module 208, etc.) with a network (e.g., network 204) and/or other system components. Such circuitry may comprise conventional transceivers of a type well known in the art.

The computing device architecture 400 may comprise additional known components (not expressly shown) such as parallel processing systems, physical machines, virtual machines, virtual switches, storage volumes, etc. Again, the computing device architecture shown in the figure is presented by way of example only, and system 200 may include additional or alternative computing architectures, as well as numerous distinct computing architectures in any combination.

Also, numerous other arrangements of servers, computers, storage devices or other components are possible in the system 200. Such components can communicate with other elements of the system 200 over any type of network or networks.

Furthermore, it is to be appreciated that the system 200 of FIG. 2 can comprise virtual machines (VMs) implemented using a hypervisor. A hypervisor is an example of what is more generally referred to herein as "virtualization infrastructure." The hypervisor runs on physical infrastructure. As such, the content randomization techniques illustratively described above as a protected online service can be provided as one or more cloud services. The cloud services thus run on respective ones of the virtual machines under the control of the hypervisor. System 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the system 200 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX and Symmetrix VMAX, both commercially available from EMC Corporation of Hopkinton, Mass. A variety of other storage products may be utilized to implement at least a portion of the cloud services.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   receiving at a randomizer module from a first computing device content retrieved by the first computing device in response to a content request by a second computing device;
   randomly altering at the randomizer module the content to generate randomly altered content;
   maintaining at the randomizer module log information about the random alteration to the content;
   sending from the randomizer module to the first computing device the randomly altered content such that the first computing device is able to provide the randomly altered content to the second computing device in response to the content request by the second computing device;
   receiving at the randomizer module from the first computing device reply content received from the second computing device in response to the randomly altered content;
   removing at the randomizer module the random alteration from the reply content using the log information; and
   sending from the randomizer module to the first computing device the reply content after removal of the random alteration.

2. The method of claim 1, further comprising establishing a randomization session between the first computing device and the randomizer module prior to receipt of content to be randomly altered.

3. The method of claim 2, wherein the random alteration is different for a subsequent randomization session.

4. The method of claim 1, wherein the content to be randomly altered comprises at least one web page.

5. The method of claim 4, wherein the step of randomly altering the content further comprises inserting one or more elements into the source code of the web page.

6. The method of claim 4, wherein the step of randomly altering the content further comprises obfuscating one or more input field names in the source code of the web page.

7. The method of claim 1, wherein the randomizer module is remote from the first computing device.

8. The method of claim 1, wherein the randomizer module is resident on the first computing device.

9. The method of claim 1, wherein the first computing device comprises a web server.

10. The method of claim 1, wherein the second computing device comprises a client device.

11. A computer program product comprising a non-transitory processor-readable storage medium having encoded therein executable code of one or more software programs, wherein the one or more software programs when executed by at least one processor implement steps of the method of claim 1.

12. An apparatus, comprising:
    a memory; and
    at least one processor operatively coupled to the memory and configured to:
    receive from a first computing device content retrieved by the first computing device in response to a content request by a second computing device;
    randomly alter the content to generate randomly altered content;
    maintain log information about the random alteration to the content;
    send to the first computing device the randomly altered content such that the first computing device is able to provide the randomly altered content to the second computing device in response to the content request by the second computing device;
    receive from the first computing device reply content received from the second computing device in response to the randomly altered content;
    remove the random alteration from the rely content using the log information; and
    send the reply content to the first computing device after removal of the random alteration.

13. The apparatus of claim 12, wherein the processor is further configured to establish a randomization session with the first computing device prior to receipt of content to be randomly altered.

14. The apparatus of claim 13, wherein the random alteration is different for a subsequent randomization session.

15. The apparatus of claim 12, wherein the content to be randomly altered comprises at least one web page.

16. The apparatus of claim 15, wherein randomly altering the content further comprises inserting one or more elements into the source code of the web page.

17. The apparatus of claim 15, wherein randomly altering the content further comprises obfuscating one or more input field names in the source code of the web page.

18. The apparatus of claim 12, wherein the first computing device comprises a web server and the second computing device comprises a client device.

* * * * *